United States Patent [19]
Polidori

[11] Patent Number: 5,309,248
[45] Date of Patent: May 3, 1994

[54] SYSTEM FOR SIMULTANEOUS LONG-DISTANCE VISION OF VIDEO PICTURES REPRODUCED BY A TRANSMITTING VIDEORECORDER AND RECEIVING VIDEORECORDER

[76] Inventor: Stefano Polidori, Rome, Italy
[21] Appl. No.: 945,863
[22] Filed: Sep. 16, 1992
[30] Foreign Application Priority Data
  Sep. 30, 1991 [IT] Italy .................. RM91 A 000732
[51] Int. Cl.⁵ .............................. H04N 5/76
[52] U.S. Cl. ..................... 358/335; 360/33.1
[58] Field of Search ............. 358/335, 310, 311, 312;
  360/33.1, 35.1, 9.1, 10.1, 10.2, 10.3, 13, 14.1,
  14.2, 14.3, 71, 72.1, 73.1, 73.02; 379/53-54,
  96-98; H04N 5/76, 9/79

[56] References Cited
U.S. PATENT DOCUMENTS

| 4,618,895 | 10/1986 | Wright | 358/311 |
| 4,675,757 | 6/1987 | Block | 360/14.3 |
| 4,928,168 | 5/1990 | Iwashita | 358/86 |

FOREIGN PATENT DOCUMENTS

| 228878A | 7/1987 | European Pat. Off. | H04N 5/78 |
| 2-216985 | 8/1990 | Japan | H04N 5/782 |
| 3-70282 | 3/1991 | Japan | H04N 5/782 |

OTHER PUBLICATIONS
Berlin, "The Phase Detector", 1988, pp. 24-26.

Primary Examiner—Tommy P. Chin
Assistant Examiner—Thai Tran
Attorney, Agent, or Firm—Darby & Darby

[57] ABSTRACT

A system for simultaneous long-distance vision of video pictures reproduced by a transmitting videorecorder and a receiving videorecorder, which comprises a transmitting subsystem (1) and a receiving subsystem (2), each arranged in different and mutually distant places; the transmitting subsystem (1) comprises a transmitting video recorder (TX), in which a video cassette is loaded which video cassette has on one of its two audio tracks a position code, a first electronic exchange (100) of a sequence of data (D) identifying position and state of the transmitting video recorder (TX), which first electronic exchange (100) is connected to a telephone line (LT) through a modem device (M1); the receiving subsystem (2) comprises a receiving video recorder (RX), in which a video cassette identical to the one loaded in the transmitting video recorder (TX) is loaded, having on one of its two audio tracks a position code which is identical to the one loaded on the transmitting video recorder (TX), a second electronic exchange (200) of control, reception, comparison and processing of the data sequence (D) identifying position and state of the transmitting video recorder (TX), coming from the first electronic exchange (100), with respect to the sequence of data (DR) identifying the position of the receiving video recorder (RX); the second electronic exchange (200) being connected to the receiving video recorder (RX) and also to a telephone line (LT) through a modem device (M2).

7 Claims, 3 Drawing Sheets

SYSTEM FOR SIMULTANEOUS LONG-DISTANCE VISION OF VIDEO PICTURES REPRODUCED BY A TRANSMITTING VIDEORECORDER AND RECEIVING VIDEORECORDER

BACKGROUND OF THE INVENTION

1. Field of the Invention

The invention relates to a system for simultaneous long-distance vision of video pictures reproduced by a transmitting videorecorder and a receiving videorecorder, in particular for example for the dubbing of a film made in two different cities.

2. Description of the Related Art

The transmission of pictures in real time is a problem that has always been solved using transmission via radio of the televisual signal either directly or by means of radio link or satellite, or a combination of these types of transmission.

Management, apparatus and personnel costs for these technical solutions make this service accessible only to large corporations, such as, in Italy the Rai (the National Radio and Television Network) or large private companies.

Recently the SIP (Italian public telephone service) has made available a teleconference service, which has a very high cost per minute and is therefore out of the reach of private operators needing image contemporaneity in two places which may be hundreds of kilometres away. Thus there is the lack of a system which permits contemporary vision of images in two distant places at a cost which is accessible, which would help to enhance development of new activities with regard to the service itself.

SUMMARY OF THE INVENTION

The aim of the present invention is that of eliminating the above-mentioned drawbacks by creating a system for simultaneous long-distance vision reproduced by a transmitting videorecorder and a receiving videorecorder, obtaining thus a simultaneity of pictures in two different places, distant from each other even by hundreds of kilometres.

Another aim of the present invention is to create a system which is neither massive and unwieldy nor economically unviable.

The invention, as it is characterised in the claims, solves the problem of providing a system for long-distance vision of video images reproduced by a transmitting videorecorder and a receiving videorecorder which, from the general point of view, is characterised by the fact of comprising a transmitting subsystem and a receiving subsystem, each disposed in different and mutually distant places; the transmitting subsystem comprises:

a transmitting videorecorder, in which a video cassette is inserted and on one of whose two audio tracks a position code is recorded;

a first electronic reading processing and transmitting exchange of a sequence of data identifying position and state of the said transmitting videorecorder, respectively connected to a telephone line by means of a modem device; the said receiving subsystem comprising:

a receiving videorecorder, in which a video cassette identical to the one loaded in the transmitting videorecorder is inserted, and having on one of its two audio tracks a position code which is identical to the one loaded on the transmitting videorecorder;

a second electronic exchange for control, reception, comparison and procession of the data sequence identifying position and state of the transmitting videorecorder coming from the first electronic exchange, with respect to the data sequence identifying the position of the receiving videorecorder; the second electronic exchange being connected to said receiving videorecorder and also to a telephone line by means of a modem device;

the said first electronic exchange has the function of reading, processing and sending the sequence of data regarding the position and state of the transmitting videorecorder, which functions are managed by a first processing program; the second electronic exchange has the function of control, reception, comparison and processing of the data coming from the transmitting subsystem with the data identifying the position of the videorecorder in command functions for the receiving videorecorder, obtaining picture simultaneity on the said videorecorders, functions which are managed by a second processor program.

BRIEF DESCRIPTION OF THE DRAWINGS

The invention is described in more detail in the following, with the help of drawings which represent an embodiment which is in the form of a non-limiting example, and in which.

DETAILED DESCRIPTION OF THE PRESENTLY PREFERRED EXEMPLARY EMBODIMENT

Figure 1:
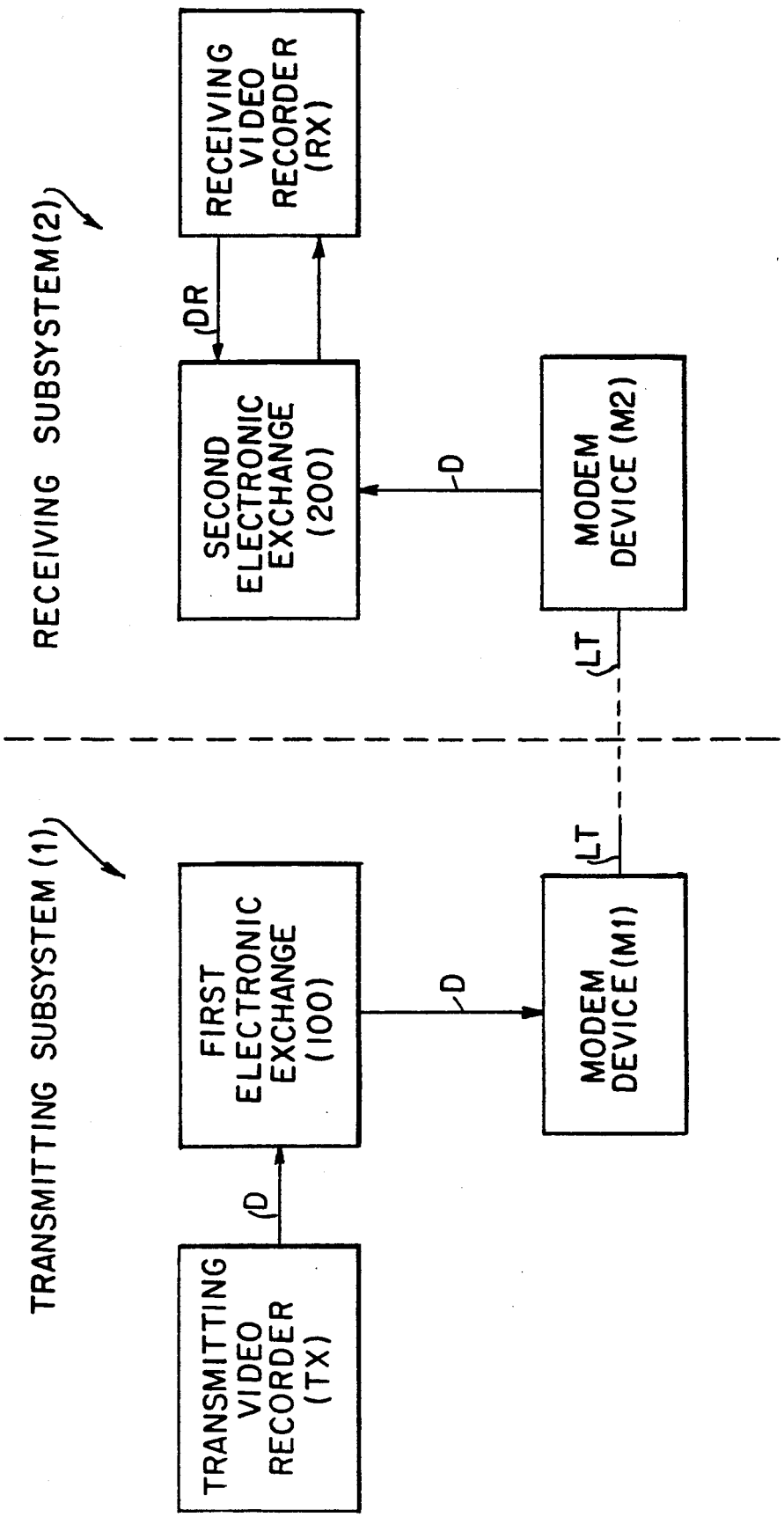
FIG. 1 shows a block system of the entire modular system subdivided into transmitting subsystem and receiving subsystem according to the invention.

With reference to the invention, in FIG. 1 a system for long-distance vision is shown, that is the vision of images reproduced by a transmitting video recorder TX and a receiving video recorder RX. In particular, the system comprises a transmitting subsystem 1 and a receiving subsystem 2 arranged in two different positions and even hundreds of kilometers apart.

The transmitting subsystem 1 comprises a transmitting video recorder TX, for example a Sony series 500, in which a video cassette is loaded having on one of its two audio tracks a position code, for example the EBU code (European Radiophonic Organisations Union).

The transmitting video recorder TX is connected to a first electronic exchange 100 with a reading, processing and sending function of a series of data D which identify the position and the state of the transmitting video recorder TX. The electronic exchange 100 is connected to a telephone line LT by means of a modem device M1.

According to the invention, the receiving subsystem 2 comprises a receiving video recorder RX, in which a video cassette identical to the one loaded in the transmitting video recorder TX is loaded, and has on one of its two audio tracks a position code which is identical to the one loaded on the transmitting video recorder TX. The said receiving video recorder RX is connected bidirectionally to a second electronic exchange 200 which has functions of control, reception, comparison and processing between the data D sequence which identify the position and the state of the transmitting video recorder TX, coming from the said first electronic exchange 100, and the DR data sequence which identifies the position of the receiving video recorder RX. The second electronic exchange 200 is connected to the receiving video recorder RX and to a telephone line LT by means of a modem device M2.

The first electronic exchange 100 has the function of continually reading, processing and sending a sequence of data D to the second electronic exchange 200, which data D identify the position and the state of the transmitting video recorder TX, according to a first processor program. The receiving electronic exchange 200 which receives the data D sequence from the telephone line LT, has thus the function of controlling, receiving and comparing the data D received with respect to the position of the receiving video recorder RX and, when a difference is read, the electronic exchange 200 has the function of processing commands such as for example the forward/reverse to the receiving video recorder RX. In particular any variation in the position and the state of the transmitting video recorder TX is processed by the electronic exchange 100 and the data received are transmitted on the telephone line LT and thus to the receiving subsystem 2. The data DR regarding the position of the receiving video recorder RX are read by the second electronic exchange 200 and are compared with the sequence of the data D received via modem by the transmitting subsystem 1. Where there is a difference of position the second electronic exchange 200 will see to giving the correct commands to the receiving video recorder RX so as to ensure simultaneity of pictures in two different and distant positions.

The management of the said functions happens, as has been previously indicated, by means of a first processor program for the transmitting subsystem 1 and by a second processor program for the receiving subsystem 2.

Figure 2:
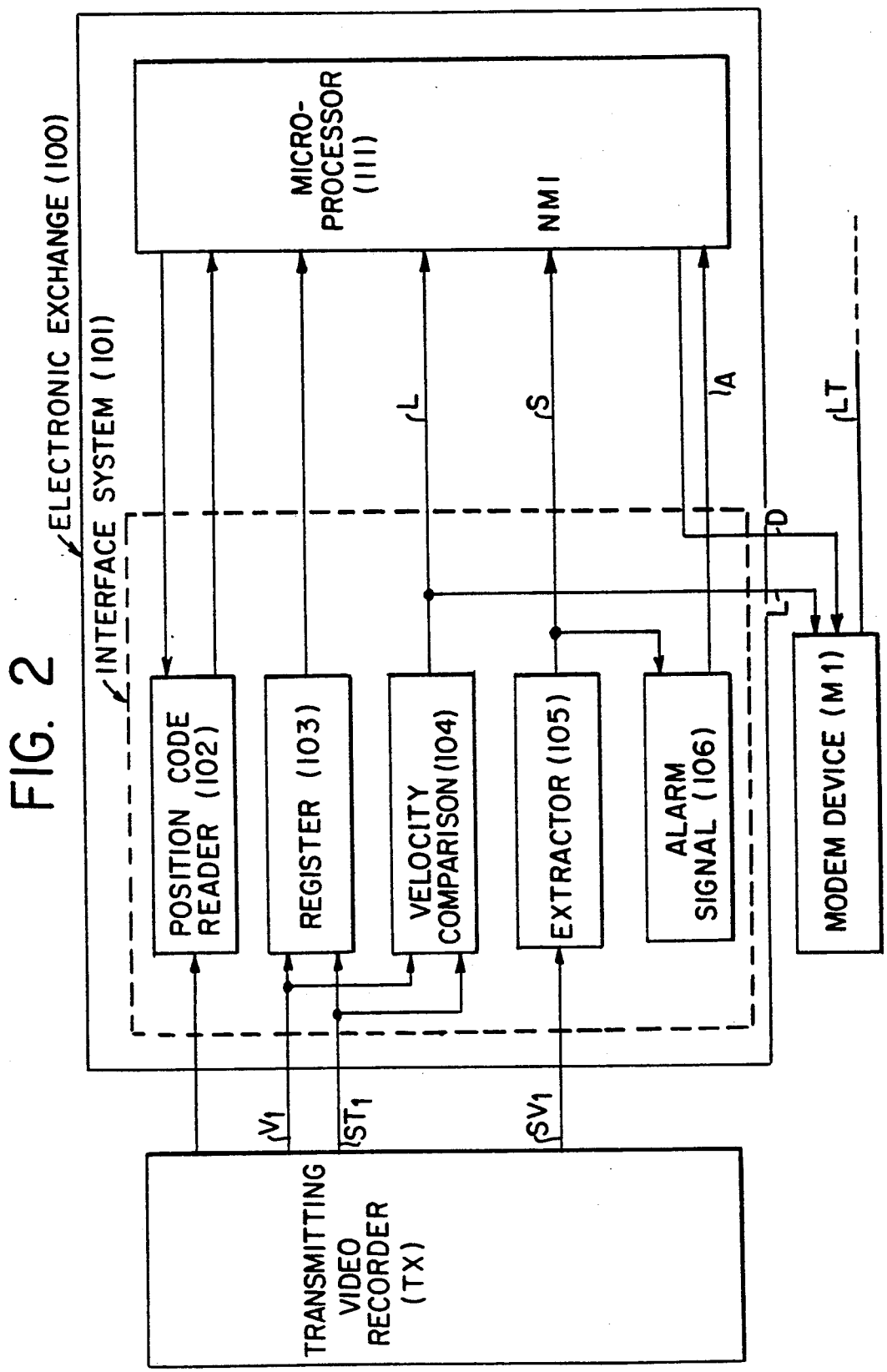
FIG. 2 shows a block system of the transmitting subsystem according to the invention.

As is shown in FIG. 2, the said first electronic exchange 100, which has has already been mentioned, is connected in input to the said transmitting video recorder TX and in output to the modem system M1, and comprises an interface system 101 which is connected bidirectionally to a microprocessor 111 and directionally to the said modem device M1.

The interface system 101 comprises respectively a position code reader circuit 102, connected in input to the said transmitting video recorder TX and in output to the microprocessor 111, bidirectionally so as to be read continuously by the microprocessor 111. 103 indicates a transmitting video recorder TX position reading circuit 103, for example a register, having in input a direction signal V1 and a tachometric signal ST1, both coming from the transmitting video recorder TX, the transmitting video recorder TX position reading circuit 103 being connected bidirectionally to the microprocessor 111. The direction signal V1 and the tachometric signal ST1, taken by the transmitting video recorder TX, will be applied to the transmitting video recorder TX position reading circuit 103 which at any time will give the position of the transmitting video recorder TX to the microprocessor 111. The interface system 101 also comprises a velocity comparison circuit 104 which is connected in input to the transmitting video recorder TX by means of the direction signal V1 and the tachometric signal ST1 and in output by means of a logical signal L to the modem device M1 and to the microprocessor 111.

The logical signal L identifies if the frequency of the tachometric signal ST1 corresponds to the running speed of the video cassette loaded in the transmitting video recorder TX. If the state of the logical signal L is 1 then the running speed corresponds to the frequency of the tachometric signal ST1 at less than a percentage deviation, for example 5 percent. If the state of the logical signal is equal to 0, then the transmitting video recorder TX is in a slowing-down phase or in a forward or reverse search phase. 105 denotes an extractor circuit for video synchronism which has in input the video signal SV1 and in output a synchronism signal S, which latter activates the interrupt function of the microprocessor 111. The synchronism signal S, on the basis of the first processor program, will serve to increase a register code, internally to the microprocessor 111, with successive control of the transmission of the data sequence D on the position of the transmitting video recorder TX to the modem device M1. In the case in which the synchronism signal S is lacking for a time longer that 50 ms, an alarm signalling circuit 106, also arranged internally to the interface system 101, intervenes. The alarm signalling circuit 106 has in input the synchronism signal S and in output is connected to the said microprocessor 111 through a logical alarm signal A which reveals the lack of the synchronism signal. The said microprocessor 111 is connected in output to the said modem device M1 through the data sequence D identifying the position of the transmitting video recorder TX and any eventual control/reading/writing signals (not shown in the drawing).

The principal function of the said microprocessor 111 is thus that of reading, processing and sending the data sequence D identifying the position and the state of the transmitting video recorder Tx to the receiving subsystem 2. In particular, as long as the logical signal L of the velocity comparison circuit 104 is 0, the microprocessor 111, with reference to the first processor program, will see to sending the data sequence D identifying the position of the transmitting video recorder TX to the modem device M1, on the basis of the reading on the transmitting video recorder TX position reading circuit 103. At the moment when the state of the logical signal L is 1, the position code circuit 102 is read and memorised in the internal code register of the microprocessor 111. In this situation the microprocessor 111 performs a comparison operation between the read value, which constitutes the real position of the video cassette loaded in the transmitting video recorder TX and the value obtained from the reading of the position circuit 103. If there is a difference between the read values, then the difference is memorized in a difference register internal to the microprocessor 111. The microprocessor 111 instructs the interrupt function, generated by the synchronism signal S, to increase the code register and to transmit the data D sequence. In the contrary case, that is in the case in which the logical signal L is 0, then the microprocessor 111 will resend to the modem device M1 the data sequence D identifying the position and the state of the transmitting video recorder TX on the basis of the reading of the position reading circuit 103 added to the memorized value in the difference register.

Figure 3:
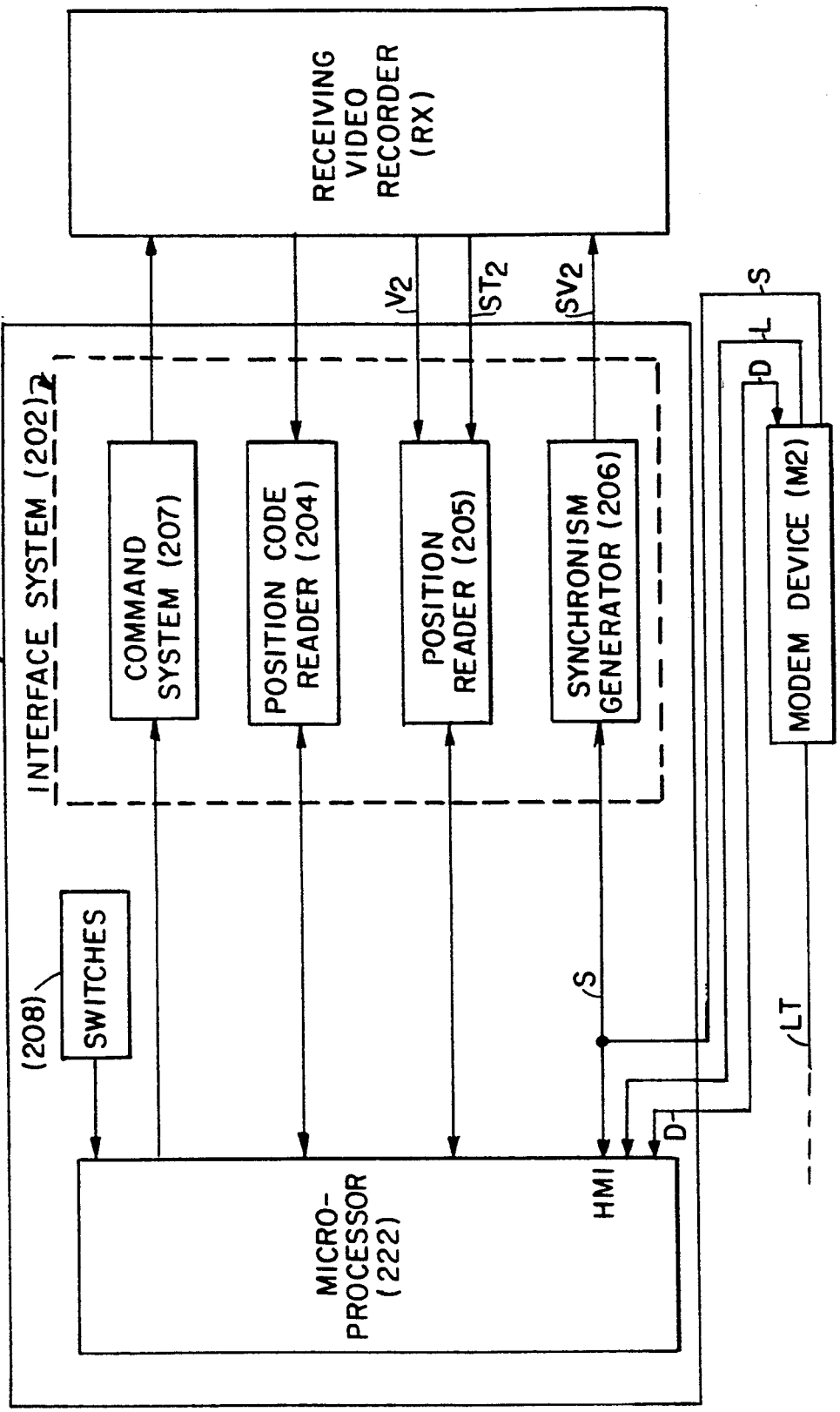
FIG. 3 shows a block system of the receiving system according to the invention.

In FIG. 3 a block system of the receiving subsystem 2 is shown. The electronic exchange 200 connected both in input and in output to the receiving video recorder RX comprises an interface system 202 connected bidirectionally to a microprocessor 222 and to the modem device M2.

The modem device M2 is connected in input to the telephone line LT and bidirectionally in output to the microprocessor 222 and directionally to the interface system 202.

The modem device M2 has the task of reading the data sequence D arriving from the transmitting subsystem 1 and of communicating to the microprocessor 222 the data identifying the position and the state of the transmitting video recorder TX. The modem device M2, as shown in FIG. 3, also has in output a synchronism signal S2 obtained from the reading of the data arriving, connected in input both to the microprocessor 222, aimed at activating the interrupt function of the microprocessor 222, and to the interface system 202. The modem M2 device has also in output a logical signal L, also extracted from the data sequence D coming from the transmitting subsystem 1, connected to the microprocessor 222. The signal L reflects the logical state of the velocity comparison circuit 104 of the transmitting subsystem 1, so as to inform the microprocessor 222 of the state of the transmitting video recorder TX.

As is shown in FIG. 3, the interface system 202 comprises a position code reader circuit 204 which is connected in input to the receiving video recorder RX and to the microprocessor 222 bidirectionally, so as to be read continuously by the microprocessor 222; it further comprises a position reader circuit 205 of the receiving video recorder RX having in input a direction signal V2 and a tachometric signal ST2, both signals coming from the said receiving video recorder RX connected bidirectionally to the microprocessor 222. 206 denotes a synchronism generator which has in input the synchronism signal S, which signal comes from the modem system M2, and is connected in output to the video signal SV2 of the receiving video recorder RX, while 207 denotes a command system connected in input to the microprocessor 222 and in output to the receiving video recorder RX. 208 indicates command means, for example switches, activatable by the user to generate, respectively, position reading functions and activation and deactivation of the electronic exchange 200.

As has already been mentioned, the microprocessor 222, through a second processor program, has the function of reading the data sequence D from the transmitting subsystem 1 through the telephone line LT and obtaining the position of the transmitting video recorder TX. Furthermore, the microprocessor 222 has the function of comparing the position of the receiving video recorder RX with the data obtained and of sending command signals to eliminate any eventual differences. In this way a perfect coupling between the two video recorders is established after a very few seconds from the moment in which the start command is given to the transmitting subsystem 1. During the forward-/reverse search phase and the fast winding of the videocassette, the system is able to make the receiving video recorder RX follow the transmitting video recorder TX at exactly the same speed.

What I claim is:

1. A system for simultaneous long-distance vision of video images reproduced by a transmitting videorecorder and a receiving videorecorder comprising: a transmitting subsystem (1) and a receiving subsystem (2), each disposed in different and mutually distant places; said transmitting subsystem (1) comprising:

a transmitting videorecorder (TX), in which a video cassette is inserted and on one of whose two audio tracks a position code is recorded;

a first electronic reading processing and transmitting exchange (100) of a sequence of data (d) identifying position and state of said transmitting videorecorder (TX), respectively connected to a telephone line (LT) by means of a first modem device (M1); said receiving subsystem (2) comprising:

a receiving videorecorder (RX), in which a video cassette identical to the one loaded in the transmitting videorecorder (TX) is inserted, and having on one of its two audio tracks a position code which is identical to the one loaded on the transmitting videorecorder (TX);

a second electronic exchange (200) for control, reception, comparison and procession of the data sequence (D) identifying position and state of the transmitting videorecorder (TX) coming from the first electronic exchange (100), with respect to the data sequence (DR) identifying the position of the receiving videorecorder (RX); said second electronic exchange (200) being connected to said receiving videorecorder (RX) and also to a telephone line (LT) by means of a second modem device (M2);

said first electronic exchange (100) having the function of reading, processing and sending the sequence of date (D) regarding the position and state of the transmitting videorecorder (TX), which functions are managed by a first processing program; said second electronic exchange (200) having the function of controlling, receiving, comparing and processing of said data coming from said transmitting subsystem (1) with the data identifying the position of the receiving videorecorder (RX) in command functions for the receiving videorecorder (RX), obtaining picture simultaneity on said videorecorders (TX,RX), which functions are managed by a second processor program, said first electronic exchange (100), connected in input to said transmitting video recorder (TX) and in output to said first modem system (M1) comprises an interface system (101) connected bidirectionally to a microprocessor (111) and directionally to said first modem device (M1), said second electronic exchange (200), connected both in input and in output to said receiving video recorder (RX) comprises a second interface system (202) connected bidirectionally to a second microprocessor (222) and to said second modem device (M2), said second microprocessor (222), through said second processor program, has the function of reading the data (D) from said transmitting subsystem (1), comparing the position of the receiving video recorder (RX) with said read data, the difference, and sending command signals to eliminate said difference.

2. A system in claim 1, wherein said interface system (101) comprises respectively a position code reader circuit (102), connected to said microprocessor (111) bidirectionally, so as to be continuously read by said microprocessor (111), a transmitting video recorder (TX) position reading circuit (103), having in input a direction signal (V1) corresponding to a position of said transmitting video recorder and a tachometric signal (St1) corresponding to a velocity of said transmitting video recorder both originating from said transmitting video recorder (TX) connected bidirectionally to said microprocessor (111), a velocity comparison circuit (104), to identify if the frequency of said tachometric signal (St1) corresponds to the running speed of the video cassette loaded in said transmitting video recorder (TX); connected in input to said transmitting video recorder (TX) through the direction signal (V1) and the tachometric signal (St1) and connected in output through a logical signal (L) to said first modem device (M1) and to the microprocessor (111), an extractor circuit for video synchronism (105), having in input the video signal (SV1) and in output a synchronizing signal (S), connected in input to said microprocessor (111), an alarm signalling circuit (106) having for its input a logical alarm signal (A), which reveals the lack of a synchronism signal (S), connected in input to said microprocessor (111) being connected in output to said modem device (M1) through the sequence of data (D) identifying the position and the state of the transmitting video recorder (TX) and signals of control/reading/writing.

3. A system according to claim 2, wherein said direction signal (V1) and said tachometric signal (St1) are read by the transmitting video recorder (TX) and applied in said position reading circuit (103) so as to be read continuously by said microprocessor (111).

4. A system according to claim 2, wherein said logical signal (L) identified a logical state which is 1, in which the frequency of said tachometric signal (St1) corresponds to the running speed of said videocassette at less than a percentage deviation, and a logical state which is 0, in which it identifies a slowing phase or a forward/reverse search phase of said video cassette.

5. A system according to claim 2 wherein said microprocessor (111), according to the first processor program, with a logical signal (L) equal to 1 of the velocity comparison circuit (104), reads the position code circuit (102) and memorizes the data in a code register internal to said microprocessor (111), with a successive comparison operation between the read value, constituting the real position of the video cassette loaded in said transmitting video recorder (TX) and the value read by the position reading circuit (103), the memorization of a difference between the values read in a difference register; said microprocessor (111) activating an interrupt signal, being generated by said synchronizing signal (S), to increase a code register and to send the data sequence (D); said microprocessor (111) sending said data (d), where said logical signal (L) is equal to 0, to said first modem device (M1) on the basis of the reading of the position circuit (103) added to the memorized value in said difference register.

6. A system, according to claim 1 wherein said second modem device (M2) is connected in input to the telephone line (LT) and in output bidirectionally to said second microprocessor (222) for the sending of data (D) arriving from said telephone line (LT); said second modem device (M2) having in output a logical signal (L) connected in input to said second microprocessor (222) and a synchronizing signal (S2) connected in input to said second microprocessor (222), managed according to an interrupt criterion, and to said second interface system (202).

7. A system as in claim 1, wherein said second interface system (202) comprises a position code reader circuit (204), connected in input to said receiving video recorder (RX) and to said second microprocessor (222) bidirectionally, so as to be read continuously by said second microprocessor (222), a receiving video recorder (RX) position reader circuit (205), having in input a direction signal (V2) and a tachometric signal (St2) both coming from said receiving video recorder (RX), connected bidirectionally to said second microprocessor (222), a synchronism generator (206) having in input the synchronism signal (S) coming from the second modem system (M2) connected in output into the video signal (SV2) of the receiving video recorder (RX), a command system (207), connected in input to said second microprocessor (222) and in output to said receiving video recorder (RX), command means (206) activatable by the user to generate signals respectively of position reading and activation and deactivation of said electronic exchange (200).

* * * * *